United States Patent Office 3,578,641
Patented May 11, 1971

3,578,641
RESINOUS ESTERS OF POLYMERIC
N-HYDROXYIMIDES
John H. Johnson, Kirkwood, Mo., assignor to
Monsanto Company, St. Louis, Mo.
No Drawing. Filed Apr. 1, 1968, Ser. No. 717,987
Int. Cl. C08g 20/38
U.S. Cl. 260—78    6 Claims

ABSTRACT OF THE DISCLOSURE

Esters of N-hydroxy-substituted olefin-maleimide copolymers and N-blocked α-amino carboxylic acids or peptides; the method of producing said esters; and use of said esters in peptide synthesis which comprises condensing the ester with an α-amino carboxylic acid or a first peptide or an ester or amide of said acid or first peptide to obtain a second peptide and regenerated N-hydroxy-substituted olefin-maleimide copolymer. Also disclosed is the removal of the N-blocking from the peptide esters of said N-hydroxy-substituted copolymers and intramolecular cyclization of the unblocked ester to give cyclic peptides.

BACKGROUND OF THE INVENTION (1) Field of the invention

New polymers and use thereof in peptide synthesis.

(2) Background of the invention

Resinous polymers have been frequently used in peptide synthesis. Thus, in the Merrifield solid phase method (R. B. Merrifield, J. Amer. Chem. Soc., 85, 2149 (1963) and Biochem., 3, 1385 (1964), and G. R. Marshall and R. B. Merrifield, Biochem., 4, 2394 (1965)), a C-terminal amino acid having the α-amino group blocked is attached to an insoluble, polymeric resin (cross-linked chloromethylated polystyrene). Subsequent amino acids are attached sequentially on the resulting insoluble complex until the desired peptide is completed. Since the growing peptide is insolubilized by the bond with the polymer, excess reactants and waste products may be removed by vigorous washing. The peptide is then stripped from the complex, e.g. by treatment with hydrogen fluoride. Purification of the peptide is conducted after it has been detached from the polymer-peptide complex. The present invention, wherein said amino acid or peptide esters of the polymeric N-hydroxyimides are used in peptide synthesis, differs from the Merrifield method in that it enables preparation of the desired peptide with necessary side-chain blocking groups intact, thus permitting subsequent peptide coupling reactions and selected chemical modifications with a minimum of undesired side reactions. Such protecting groups are generally removed in the process required by Merrifield to strip the peptide from the resin employed by him. Also, in a reverse-type of the Merrifield synthesis, Patchornik and coworkers (J. Amer. Chem. Soc., 88, 3164 (1966)) have attached any of several N-blocked amino acids to an insoluble copolymer of nitrated polystyrylphenol. The product of this attachment then serves as a reservoir for amino acids that are to be added to amino acids, their esters or peptides. The present invention differs from Patchornik in providing a linkage between amino acid and polymer which is extremely labile; hence very short contact time with the reservoir resin complex is permitted: in the present process minutes or seconds are required as compared to hours for the Patchornik method.

This invention also provides a novel method of preparing cyclic peptides. This is accomplished by preparing an ester of an N-blocked polypeptide and the N-hydroxy-substituted olefin-maleimide copolymer, and subsequently removing the N-blocking from the peptide moiety to obtain the regenerated polymer and the cyclized peptide.

SUMMARY OF THE INVENTION

This invention provides a method for the rapid formation of peptides in substantially quantitative yields, with minimal needs for product purification and with retention of desirable side chain blocking groups. These results have been achieved by employing as starting materials, N-hydroxy-substituted copolymers of maleimide and a mono-olefinic compound selected from the class consisting of the lower aliphatic mono-olefins, mono-vinyl-substituted aromatic compounds, mono-vinyl-substituted heterocyclic compounds, vinyl alkanoates, and vinyl alkyl and divinyl ethers. According to the invention, said hydroxy-substituted copolymers are esterified with an N-blocked α-amino carboxylic acid or peptide to give resinous copolymers compounds having the repeating unit

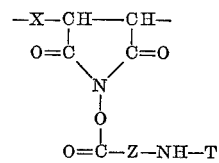

wherein X denotes an alkylene radical having from 2 to 12 carbon atoms or such a radical carrying as a substituent a radical selected from the class consisting of aryl and alkaryl radicals of from 6 to 9 carbon atoms, heterocyclic nitrogen radicals of from 5 to 7 carbon atoms, carboalkoxy radicals of from 2 to 5 carbon atoms, and alkoxy radicals of from 1 to 5 carbon atoms; Z denotes the moiety of an α-amino carboxylic acid or of a peptide which bridges the terminal amino group with the terminal carboxylic group of said amino acid or peptide, and T is a radical which blocks the reactivity of the amino group in which it is present.

The above-depicted compound is an extremely reactive ester. When it is contacted with an amino carboxylic acid or peptide wherein the amino group is unblocked, e.g. with a compound of the formula $H_2N$—Z—COOH, said reactive ester is cleaved, with regeneration of the N-hydroxy-substituted polymer

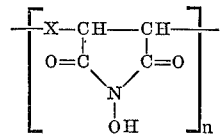

where $n$ denotes the degree of polymerization and formation of the N-blocked peptide

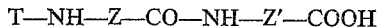

T—NH—Z—CO—NH—Z'—COOH wherein Z' is independently selected from the same group as Z. After removing the N-blocking, the residual dipeptide may be used for further reaction with other reactive esters, i.e. the N-blocked amino acid or peptide ester of the N-hydroxyimide copolymer. Alternatively, the N-blocked peptide can be used to esterify the N-hydroxy-subtsituted polymer to give another highly reactive ester:

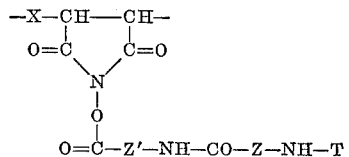

This reactive ester can be used with an amino carboxylic acid or peptide wherein the amine group is unblocked to regenerate the same N-hydroxy substituted polymer and to form a new N-blocked peptide. Thereby there may be built up peptides having any desired sequence of amino acids.

When the N-blocking is removed from the ester of the N-hydroxy-substituted copolymer and an N-blocked peptide, the free, terminal amino group attacks the ester linkage to regenerate the N-hydroxy-substituted copolymer and to give a cyclic peptide. For example, the N-blocked glycylglycine ester of the N-hydroxy-substituted copolymer reacts as follows upon removal of the blocking group (T):

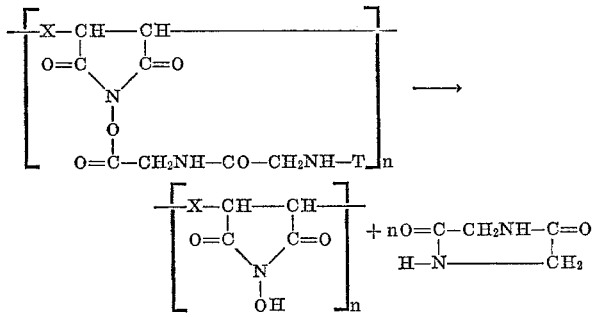

DESCRIPTION OF THE PREFERRED EMBODIMENTS

The N-hydroxy-substituted olefin-maleimide copolymers which are esterified, according to the invention, are readily obtained by the reaction of hydroxylamine or a salt thereof with the copolymer of maleic anhydride and an olefinic hydrocarbon or vinyl compound which is copolymerizable therewith. Generally, the olefinic hydrocarbon will be an aliphatic mono-olefinic hydrocarbon of from 2 to 12 carbon atoms or such an olefin carrying an aryl or alkaryl radical of from 6 to 9 carbon atoms as a substituent; e.g. ethylene, 1-butene, 2,3-dimethyl-1-butene, 1-octene, 1-hexene, 1-decene, 1-dodecene, styrene, vinyltoluene, o-, m- or p-methylstyrene, α-p-dimethylstyrene, etc. Copolymers of maleic anhydride and vinyl compounds which are generally useful for preparing the N-hydroxy copolymers of present utility include those in which the vinyl radical is attached to a heterocyclic nucleus such as 2-ethyl-5-vinylpyridine, 2-vinylfuran, N-vinyl-5-methyl-2-oxazolidinone, etc. The copolymerizable monomer may also be a vinyl ester or ether; e.g. vinyl acetate, vinyl propionate or vinyl butyrate, or methyl, ethyl or butyl vinyl ether or divinyl ether. The copolymers will generally contain substantially equimolar quantities of the maleic anhydride moiety and of the comonomer moiety and they will have a degree of polymerization which may vary from, say 100 to 10,000. The solubility properties of the copolymers will vary with the degree of polymerization and with the nature of the olefinic comonomer. In certain instances, the usefulness of the copolymers of the present purpose, i.e. for peptide synthesis, can be increased by employing swellable, but technically insoluble, cross-linked modification as the starting copolymers. Such copolymers can be obtained in several ways. For example, the maleic anhydride copolymer can be cross-linked, before being reacted with the hydroxylamine or the salts thereof, in a manner such as described in Pat. Nos. 3,060,155; 3,073,806; 3,083,189; 3,203,033 or 3,165,486. The cross-linking may also be obtained by reaction with a polyfunctional primary amine in limited quantity designed to produce controlled amounts of intermolecular cross-links based on the amide linkage formed upon opening of the stoichiometric amounts of the anhydride groups. Using cross-linked products, one has added freedom in selecting the solvents to be employed in the peptide synthesis for which the present N-hydroxy-substituted copolymers are particularly designed.

Reaction of the maleic anhydride copolymer, whether cross-linked or not, to give the N-hydroxy-substituted maleimide copolymer, is conducted as follows: the maleic anhydride copolymer is contacted with substantially an equimolar quantity of, preferably, hydroxylamine hydrochloride, in the presence of about 3 moles of a basic agent which is advantageously an organic base having an ionization constant of less than $1 \times 10^{-4}$; the product is isolated, for example by precipitation from a non-solvent such as absolute ethanol; and the precipitate is filtered off, washed, and dried under vacuum to give the N-hydroxy-substituted olefin-maleimide copolymer. Alternatively flash or spray drying may be used. The drying step removes substantially all of the organic base, e.g. pyridine or quinoline, which may be present as a salt-forming portion of an intermediately formed polymeric hydroxamic acid. If absolute freedom from basic agent is required, washing with alcoholic hydrogen chloride effectively scavenges residual amounts.

The polymeric N-hydroxyimides are quite strongly acidic, the pK of the —NOH group being about 7.2, or about the same as that of dinitrophenol. They are generally soluble in such polar solvents as water, dilute sodium hydroxide or ammonium hydroxide or other bases, dimethyl sulfoxide, N,N-dimethylformamide and N,N-dimethyl-acetamide. They are generally insoluble in hexane, ethyl ether, alcohol, dilute hydrochloric acid and dilute acetic acid.

The N-hydroxy-substituted polymeric imides are employed as follows in peptide synthesis: the hydroxy groups are esterified, i.e. acylated, with an N-blocked α-amino acid, preferably in a liquid medium which is a solvent for or swells the polymeric hydroxyimide and is a solvent for the blocked amino acid, thus:

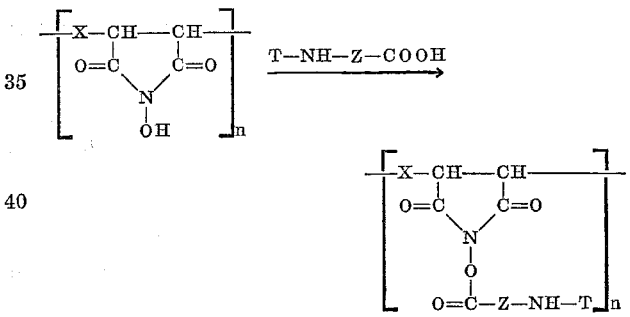

where X is the previously defined alkylene substantially alkylene radical, T is an acyl radical or another N-blocking radical customarily used in protein and peptide reactions, and Z is any of the residue normally encountered in distinguishing the amino acid moiety which is free of aliphatic unsaturation. Instead of employing the N-blocked amino acid as shown above, the acylating agent may be an N-blocked peptide. Examples of N-blocking groups are the o-nitrophenylsulfenyl (NPS), the t-butoxycarbonyl (BOC), the carbobenzyloxy (CBZ) and the t-amyloxycarbonyl (AOC) groups. Examples of useful acylating agents include the N-blocked α-amino carboxylic acids or peptides such as the N-carbohydrocarbyloxy derivatives of glycine, valine, alanine, phenylalanine, lysine, ornithine, leucine or of other α-amino carboxylic acids or of peptides, including heteropolypeptides, such as those produced by enzyme digestion or fragmentation by other cleavage means of naturally occurring proteins or synthetically formed peptides from either the same amino acid or from a number of different amino acids. It will be obvious to those skilled in the art that any of the α-amino carboxylic acids or peptides may be used and that the N-blocking of the said amino acids or peptides may be effected by any of a variety of side-chain blocking groups commonly used in peptide and protein studies for avoiding substantial competing reactions with the functional groups of the side-chain.

The acylation of the N-hydroxy-substituted polymer by the N-blocked amino acid or peptide is conveniently conducted in the presence of any of several carbodiimides which serve to activate the reacting carboxyl group. Useful carbodiimides include dicyclohexylcarbodiimide, 1-ethyl-3-(3-dimethylaminopropyl)carbodiimide, 1 - cyclohexyl-3-(2-morpholinoethyl)carbodiimide, etc. The latter two water-soluble carbodiimides are commonly furnished as their respective salts; e.g. the frequently used "Sheehan's reagent" is a toluenesulfonate of said morpholino compound. Generally, reaction occurs at ordinary room temperature; i.e. neither heating nor cooling is usually required. However, the reaction may be conducted at 0° or below if required to protect the peptides. The liquid medium in which the acylation is conducted will generally be water or a polar solvent.

The acylated polymer is very reactive. It should be stored under substantially anhydrous conditions to prevent slow, progressive hydrolysis, and it is rapidly attacked by ammonia and amines. The acylated polymer is readily cleaved upon treatment with an α-amino carboxylic acid or a peptide (including the C-terminal esters or amides thereof), with condensation of the cleaved fragment (which may be an amino acid or peptide moiety) and the attacking amino acid or peptide derivative. This condensation builds up the peptide chain, a new peptide bond being formed by linking the previously attached moiety with the attacking moiety. For example, a dipeptide is built up as follows, employing N-hydroxy-substituted ethylene-maleimide copolymer as carrier resin:

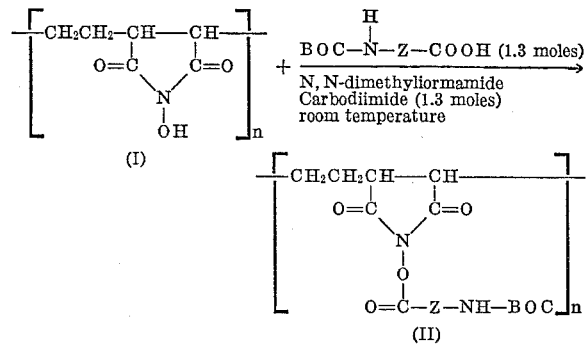

In addition to the acylated polymer (II), a substituted urea, derived from the carbodiimide, is formed as by-product. The acylated, reactive polymer behaves as follows with an amino acid compound such as the methyl ester of glycine:

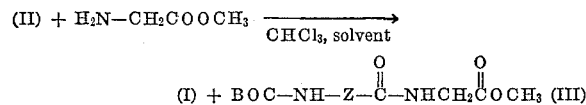

The blocking group BOC of product (III) can be removed in the customary manner which is used for removing such groups in amino acid and peptide cehmistry; e.g. by reaction with dilute acids, hydrogenation, reaction with nucleophilic agents, etc. For example, peptide synthesis can proceed with product (III) by treating it with hydrochloric acid-acetic acid to remove the BOC group, and subsequent use of the unblocked (III) with a reactive ester of the type (II). Subsequent removal of the N-blocking group which will be present in the N-terminal end of the new peptide, makes possible successive additions of amino acids or peptides.

In the normal practice of the invention, an excess of the amino acid or peptide attached to the resin, relative to the attacking amino acid or peptide is employed. This may range from five percent to several hundred percent, being practically limited in the upper range by economics. However, it should be recognized that such resins can be re-used until they can no longer supply the excess residues required, at which time they may be regenerated to their initial state of effectiveness by repeating the acylation conversion step (e.g. (I) to (II)).

Any sequence of amino acid or peptide fragments may be formed. For example, reaction of N-hydroxy-substituted butene-maleimide copolymer with N-blocked glycine gives a reactive, polymeric ester which, upon contact with alanine, gives the N-blocked product Gly—Ala. After removal of the N-blocking, it can be reacted with another mole of a reactive, polymeric ester which had been prepared by reacting N-hydroxy-substituted ethylene-maleimide copolymer with N-carbobenzyloxyleucine to give the N-blocked product CBZ—Leu—Gly—Ala. After removal of the N-terminal block, this ternary heteropolypeptide may be reacted with another mole of a reactive polymeric ester, e.g. one which had been prepared by reaction of N-hydroxy-substituted ethylenemaleimide copolymer with an N-blocked α-aminocarboxylic acid as phenylalanine, and the above procedure repeated.

The peptide products are also useful in synthesis of new peptides by employing the N-blocked products as the acylating agents for preparing reactive esters from N-hydroxy-substituted olefin-maleimide copolymers. For example, the N-blocked product CBZ—Leu—Gly—Ala obtained as described above can be used to esterify the N-hydroxy-substituted ethylene-maleimide copolymer to give the reactive, polymeric ester:

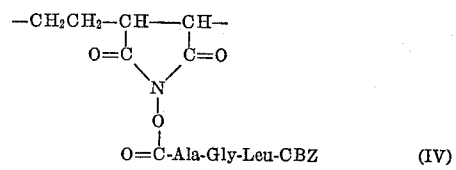

(I) may then be used to form a new peptide by reaction with an amino carboxylic acid or peptide or ester or amide thereof. (IV) may also be used to give a cyclic ester. After unblocking the N-terminal residue, the resultant free amine attacks the C-terminal active ester forming a cyclic peptide with regeneration of the polymeric N-hydroxy-imide.

A convenient, practical means of conducting the presently provided peptide synthesis comprises passing a solution of the attacking residue (amino acid or peptide) over a column packed with selected resin-carrier having the selected amino acid or peptide attached. The solvent system is such that the resin-carrier is insoluble in the solvent chosen. With cross-linked carrier resins, good solvents for the non-cross-linked polymer derivatives can be used. It will be found generally, that the common solvents such as the liquid hydrocarbons, the chlorinated hydrocarbons, the aromatic hydrocarbons and alcohols or selected mixtures thereof are useful when it is desired to use this solvent/nonsolvent technique. Solvents such as dimethylformamide, dimethylacetamide, etc., are useful in combination with cross-linked carrier resin complexes. Water can be a very useful solvent, either alone or in combination with solvents such as dimethylformamide or dimethyl sulfoxide, when the water-soluble carbodiimide activating agents are employed.

A continuous means of operation, whereby long peptide chains of substantially any sequence are formed without need of isolating intermediate products, comprises a series of columns, each column being a reservoir for a particular amino acid or peptide. The N-blocking group is one which can be conveniently removed in the stream between the columns. A good example of such a blocking group is the t-butyloxycarbonyl group, in that it decomposes in acid media to yield the readily removed gases, isobutylene and carbon dioxide. The columns are lined up in the desired order of amino acids to be incorporated into the peptide, and the solvents are selected according to the products employed. Once again, use of pre-cross-linked carrier resins permits a wider choice of solvent.

The present process thus provides a means of preparing any peptide from a variety of amino acids in any sequence. As more and more of the naturally occurring proteins, including hormones and enzymes and biologically-active fragments thereof are chemically characterized, provision of the present method for the facile synthesis thereof makes possible not only a comparatively inexpensive means of supply, but also assures a degree of purity which is rarely attainable by biological isolation.

The invention is further illustrated by, but not limited to, the following examples wherein unless otherwise stated all temperatures are degrees centigrade and parts are parts by weight.

EXAMPLE 1

To 500 ml. of water containing 55 g. (0.70 mole) of pyridine, there were added 25 g. (0.20 mole) of ethylene-maleic anhydride copolymer having a molecular weight of from 20,000 to 30,000. Hydroxylamine hydrochloride (15 g., 0.216 mole) representing an 8% excess, was dissolved in 100 ml. of water and this solution was added with stirring to the aqueous suspension of the copolymer. The resulting mixture became highly viscous in about 5 minutes; with continual stirring it became thinner, and eventually (2–3 hrs.) it formed a clear solution. Stirring was continued at room temperature overnight. The resultant solution was poured into 10 volumes of absolute ethanol to effect precipitation of product, and the precipitate was washed with ethanol and dried in a vacuum oven at room temperature to constant weight. The yield was 27.2 g. or 97.5% of theory. To remove traces of pyridine, the dried product was resuspended in alcohol, acidified with a slight excess of hydrochloric acid, and stirred for 30 minutes. It was then washed four times with ethanol and again dried to constant weight to give the substantially pure N-hydroxy substituted ethylene-maleimide copolymer, which analyzed as follows:

Calculated for imide (percent): carbon, 51.1; hydrogen, 5.00; nitrogen, 9.93. Found (percent): carbon, 51.8; hydrogen, 5.28; nitrogen, 9.43.

The product was found to be soluble in aqueous bases, dimethylformamide and dimethyl sulfoxide, and to be insoluble in most other solvents. Infrared characterization indicated a pair of carbonyl absorption peaks for the cyclic imide at 5.60 and $5.90\mu$ replacing the pair associated with the cyclic anhydride at $5.40\mu$ and $5.62\mu$. Strong hydrogen bonding absorptions were observed at 2.90, 3.15 and $3.2$–$4.0\mu$. There was a total absence of the cyclic anhydride peaks and the absorption peaks associated with the intermediate hydroxamic acid derivatives.

EXAMPLE 2

Into 15 ml. of dimethylformamide there was dissolved 0.5 g. (3.5 mmole) of the N-hydroxy-substituted copolymer obtained in Example 1. Another solution was prepared by mixing N-carbobenzyloxyglycine (1.0 g., 4.8 mmole) with 15 ml. of dimethylformamide. The two solutions were combined, and 2.0 g. (5.8 mmole) of Sheehan's reagent (1 - cyclohexyl-3-(2-morpholinoethyl) carbodiimide toluenesulfonate) was added to the resulting mixture. The whole was stirred at 0° C. for about 18 hours. A by-product urea separated from the originally clear solution as the reaction proceeded. At the end of the reaction period, the urea (about 0.81 g.) was removed by filtration and the clear filtrate was poured into 10 volumes of absolute ethanol to give a precipitate. It was filtered off and washed on the filter twice with ethanol, three times with water and finally again with ethanol and dried overnight (about 18 hours) at less than 5 mm. pressure at room temperature. There was thus obtained 0.90 g. (76.0% of the theoretical yield) of the N-carbobenzyloxyglycyl ester of N - hydroxy - substituted ethylene-maleimide copolymer.

Infrared characterization of said ester indicated a disappearance of the N—OH group as shown by loss of absorption bands at 2.9, 3.15 and $3.2$–$4.0\mu$, the retention of the imide carbonyl absorptions with a downward shift of 0.1 unit for the $5.90\mu$ peak, and the introduction of a new ester carbonyl absorption band at $5.5\mu$. The ester was soluble in dimethylformamide, dimethylacetamide and pyridine. It was insoluble in most other common solvents, but was slowly dissolved by dilute bases, presumably concurrently with resultant hydrolysis.

EXAMPLE 3

Operating substantially as in Example 2, but using alanine which had ben prepared with the amine blocked with carbo-t-butyloxy radical (or more comonly, t-butyloxycarbonyl or BOC), there was obtained the carrier resin bearing alanine residues attached by the previously described active ester linkage. The preparation is described as follows:

t-Butyloxycarbonyl-1-alanine (0.45 g., 2.4 mmole) was reacted with Sheehan's reagent (1.00 g., 2.4 mmole) for 30 minutes at 0° C. to activate the carboxyl. N-hydroxy-substituted ethylene maleimide copolymer (0.25 g., 1.77 mmole) was dissolved in 5 ml. of dimethylformamide and this solution added to the initial solution in a 50 ml. Erlenmeyer flask and reacted for 20 hours with stirring at 0.4° C. The product was precipitated in 10 volumes of water (BOC alanine is soluble in water and the excess was removed by this procedure). The solid was isolated by filtration and washed with water. The yield of polymeric active ester was 0.40 g. or 71.5% of the theoretical amount.

When alanine in the above example was replaced by the BOC derivatives of other amino acids and the analogous procedure followed, with an optional reaction temperature of 0° or room temperature, the following yields of the BOC amino acid active esters of the N—OH imide polymer were obtained: glycine, 72.5%; phenylalanine, 73.6%; nitroarginine, 53.8%.

EXAMPLE 4

The N-carbobenzyloxyglycyl ester of N-hydroxy-substituted ethylene-maleimide copolymer was prepared as described in Example 3 starting with 0.5 g. (3.55 mmole) of the polymer and 0.74 g. (3.55 mmole) of N-carbobenzyloxyglycine. After filtration of the by-product urea the active ester was precipitated with an excess of chloroform and washed thoroughly with chloroform on a sintered glass filter. It was then suspended in 10 ml. of chloroform and 0.1 g. (0.8 mmole) of glycine methyl ester hydrochloride and 0.2 g. (2.0 mmole) of triethylamine dissolved in 10 ml. of chloroform were added to the suspension. The mixture was stirred overnight at room temperature, filtered and the precipitate washed thoroughly with chloroform and ethyl acetate. The combined filtrate and washings were evaporated and the residue dissolved in ethyl acetate and filtered to remove some additional amounts of triethylamine hydrochloride. Evaporation of the filtrate gave as residue 0.25 g. of crude CBZ—Gly—Gly—OCH$_3$. This is somewhat in excess of theory based on the glycine hydrochloride methyl ester charged. Theory is 0.22 g. or 0.8 mmole. It is probable that conversion is close to 100% and that traces of unremoved triethylamine hydrochloride account for the rest. The product was then redissolved in ethyl acetate solution and washed with distilled water to remove the triethylamine salt. It was then washed twice with 0.1 N-hydrochloric acid, twice with water, twice with dilute sodium carbonate solution and finally three times with water. The ethyl acetate solution was then dried over magnesium sulfate and filtered and evaporated to give 0.15 g. (0.54 mmole) or 67% yield of theory of pure product. Much of the loss from the original product was associated with physical losses from the large number of extraction operations. Infrared absorption pattern was determined and compared with a commercially obtained sample of CBZ—Gly—Gly—OCH$_3$; no differences were noted. The product had the same melting point, and did not depress the melting point of the known sample. The regenerated N-hydroxy-substituted ethylene-maleimide copolymer was isolated as a byproduct and characterized by infrared analysis, indicating a substantial reformation of polymeric N-hydroxyimide content. Removal of the carbobenzyloxy and methyl ester blockings in conventional manner (i.e. by treatment with hydrogen bromide in acetic acid solution) yields the hydrobromide salt of the dipeptide ester, Gly—Gly—OCH$_3$. After treatment with triethylamine to remove the hydrogen bromide, it was added to a fresh portion of N-carbobenzyloxyglycine active ester of N-hydroxy-substituted ethylene-maleimide copolymer to yield the tripeptide, CBZ—Gly—Gly—Gly—OCH$_3$.

EXAMPLE 5

Styrene-maleic anhydride copolymer with a molecular weight of 20,000 to 30,000 (5.0 g., 25 mmole) was dissolved in 35 ml. of dimethylformamide and pyridine (7.0 g., 89 mmole) was added to this solution. Hydroxylamine hydrochloride (2.0 g., 29 mmole) was dissolved in 150 ml. of water and added to the reaction mixture dropwise with stirring. The reaction was continued overnight. The product was isolated by precipitation from ethanol and was dried under high vacuum. The yield was 5.37 g., which represents a 100% conversion to the N-hydroxyimide of the styrene/maleic anhydride copolymer. The product was identified by its infrared absorption spectrum. It had the pair of carbonyl peaks which are characteristic of the cyclic imide (5.65 and 5.90µ) and a total absence of the cyclic anhydride and intermediate amic acid peaks. The N-hydroxyimide of styrenemaleic anhydride copolymer herein obtained is converted to a reactive ester as in Example 2, and used in peptide synthesis as in Example 4.

It is to be understood that although the invention has been described with specific references to particular embodiments thereof, it is not to be so limited, since change and alterations therein may be made which are within the full intended scope of this invention as defined by the appended claims.

What I claim is:
1. A resinous copolymer consisting essentially of the repeating unit

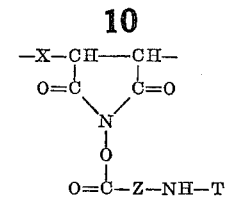

wherein X denotes an alkylene radical having 2 to 12 carbon atoms or such a radical carrying as a substituent a radical selected from the class consisting of aryl and alkylaryl radicals of from 6 to 9 carbon atoms, Z denotes the divalent residue of an α-amino carboxylic acid remaining after removal of the amino group and carboxyl group of said amino acid; and T is an inert radical which blocks the reactivity of the amino group in which said radical is present.

2. The copolymer defined in claim 1, further limited in that X is the alkylene radical.

3. The copolymer defined in claim 1, further limited in that X is the ethylene radical.

4. The copolymer defined in claim 1, further limited in that Z is the moiety of an α-amino carboxylic acid.

5. The copolymer defined in claim 1, further limited in that T is selected from the class consisting of the nitrophenylsulfenyl, the t-butoxycarbonyl, the carbobenzyloxy and the t-amyloxycarbonyl radicals.

6. The copolymer defined in claim 1, further limited in that X is the ethylene radical, Z is the methylene radical and T is the carbobenzyloxy radical.

References Cited

UNITED STATES PATENTS

| | | | |
|---|---|---|---|
| 2,402,604 | 6/1946 | Coffman | 260—78 |
| 2,977,334 | 3/1961 | Zopf et al. | 260—78 |
| 3,043,809 | 7/1962 | Mattano | 260—78 |

HAROLD D. ANDERSON, Primary Examiner

U.S. Cl. X.R.

195—29; 260—112, 112.5, 555